US011443756B2

(12) United States Patent
Godsill et al.

(10) Patent No.: US 11,443,756 B2
(45) Date of Patent: Sep. 13, 2022

(54) DETECTION AND SUPPRESSION OF KEYBOARD TRANSIENT NOISE IN AUDIO STREAMS WITH AUX KEYBED MICROPHONE

(71) Applicant: Google LLC, Mountain View, CA (US)

(72) Inventors: Simon J. Godsill, Cambridge (GB); Herbert Buchner, Cambridge (GB); Jan Skoglund, Mountain View, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 16/934,801

(22) Filed: Jul. 21, 2020

(65) Prior Publication Data

US 2020/0349964 A1 Nov. 5, 2020

Related U.S. Application Data

(63) Continuation of application No. 14/591,418, filed on Jan. 7, 2015, now Pat. No. 10,755,726.

(51) Int. Cl.
*G10L 15/20* (2006.01)
*H04M 9/08* (2006.01)
(Continued)

(52) U.S. Cl.
CPC ...... *G10L 21/0208* (2013.01); *G10L 21/0216* (2013.01); *G10L 21/0272* (2013.01);
(Continued)

(58) Field of Classification Search
CPC ......... G10L 21/00; G10L 15/20; G10L 19/00; H04M 9/00
See application file for complete search history.

(56) References Cited

U.S. PATENT DOCUMENTS 8,867,757 B1 * 10/2014 Ooi .................... G10L 21/0208 381/71.3
10,755,726 B2 * 8/2020 Godsill ............... G10L 21/0208
(Continued)

OTHER PUBLICATIONS

ISR & WO, dated Apr. 14, 2016, in related application No. PCT/US2015/068045.
(Continued)

*Primary Examiner* — Shreyans A Patel
(74) *Attorney, Agent, or Firm* — Honigman LLP; Brett A. Krueger

(57) ABSTRACT

Provided are methods and systems for enhancing speech when corrupted by transient noise (e.g., keyboard typing noise). The methods and systems utilize a reference microphone input signal for the transient noise in a signal restoration process used for the voice part of the signal. A robust Bayesian statistical model is used to regress the voice microphone on the reference microphone, which allows for direct inference about the desired voice signal while marginalizing the unwanted power spectral values of the voice and transient noise. Also provided is a straightforward and efficient Expectation-maximization (EM) procedure for fast enhancement of the corrupted signal. The methods and systems are designed to operate easily in real-time on standard hardware, and have very low latency so that there is no irritating delay in speaker response.

20 Claims, 5 Drawing Sheets

(51) Int. Cl.
*G10L 21/0208* (2013.01)
*H04R 3/00* (2006.01)
*G10L 21/0216* (2013.01)
*G10L 21/0272* (2013.01)

(52) U.S. Cl.
CPC .... *H04R 3/002* (2013.01); *G10L 2021/02165* (2013.01); *H04R 2410/03* (2013.01)

(56) References Cited

U.S. PATENT DOCUMENTS

| | | | | |
|---|---|---|---|---|
| 2004/0001143 | A1* | 1/2004 | Beal | G06K 9/0057 348/169 |
| 2006/0025992 | A1* | 2/2006 | Oh | G11B 20/24 704/226 |
| 2006/0083322 | A1* | 4/2006 | DesJardins | H04L 1/0061 375/260 |
| 2007/0055508 | A1 | 3/2007 | Zhao et al. | |
| 2008/0118082 | A1 | 5/2008 | Seltzer et al. | |
| 2008/0247274 | A1* | 10/2008 | Seltzer | G01S 3/86 367/125 |
| 2010/0145689 | A1 | 6/2010 | Li et al. | |
| 2011/0112831 | A1* | 5/2011 | Sorensen | G10L 19/012 704/226 |
| 2011/0206214 | A1* | 8/2011 | Christoph | G10K 11/17857 381/71.6 |
| 2012/0106753 | A1* | 5/2012 | Theverapperuma | H04R 3/005 381/92 |
| 2012/0116758 | A1* | 5/2012 | Murgia | G10L 21/0208 704/226 |
| 2013/0132076 | A1* | 5/2013 | Yang | G10L 25/78 704/219 |
| 2013/0332157 | A1* | 12/2013 | Iyengar | G10L 15/20 704/233 |
| 2014/0148224 | A1* | 5/2014 | Truong | H04M 9/085 455/557 |
| 2015/0310873 | A1* | 10/2015 | Park | G10L 21/0232 704/205 |

OTHER PUBLICATIONS

A. Subramanya, M.L. Seltzer, and A. Acero, "Automatic removal of typed keystrokes from speech signals," IEEE SP Letters, vol. 14, No. 5, pp. 363-366, May 2007.

B. Raj, M.L. Seltzer, and R.M. Stern, "Reconstruction of missing features for robust speech recognition," Speech Communication, vol. 43, pp. 275-296, 2004.

N. Mohammadiha and S. Doclo, "Transient noise reduction using nonnegative matrix factorization," in Proc. Joint Work-shop on Hands-Free Speech Communication and Microphone Arrays (HSCMA), Nancy, France, May 2014.

* cited by examiner

DETECTION AND SUPPRESSION OF KEYBOARD TRANSIENT NOISE IN AUDIO STREAMS WITH AUX KEYBED MICROPHONE

CROSS REFERENCE TO RELATED APPLICATIONS

This U.S. patent application is a continuation of, and claims priority under 35 U.S.C. § 120 from, U.S. patent application Ser. No. 14/591,418, filed on Jan. 7, 2015. The disclosures of this prior application is considered part of the disclosure of this application and is hereby incorporated by reference in its entirety.

BACKGROUND

In audio and/or video teleconferencing environments it is common to encounter annoying keyboard typing noise, both simultaneously present with speech and in the "silent" pauses between speech. Example scenarios are where someone participating in a conference call is taking notes on their laptop computer while the meeting is taking place, or where someone checks their emails during a voice call. Users report significant annoyance/distribution when this type of noise is present in audio data.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for signal processing. More specifically, aspects of the present disclosure relate to suppressing transient noise in an audio signal using input from an auxiliary microphone as a reference signal.

One embodiment of the present disclosure relates to a computer-implemented method for suppressing transient noise comprising: receiving an audio signal input from a first microphone of a user device, wherein the audio signal contains voice data and transient noise captured by the first microphone; receiving information about the transient noise from a second microphone of the user device, wherein the second microphone is located separately from the first microphone in the user device, and the second microphone is located proximate to a source of the transient noise; estimating a contribution of the transient noise in the audio signal input from the first microphone based on the information about the transient noise received from the second microphone, and extracting the voice data from the audio signal input from the first microphone based on the estimated contribution of the transient noise.

In another embodiment, the method for suppressing transient noise further comprises using a statistical model to map the second microphone onto the first microphone.

In another embodiment, the method for suppressing transient noise further comprises adjusting the estimated contribution of the transient noise in the audio signal based on the information received from the second microphone.

In yet another embodiment, the adjusting of the estimated contribution of the transient noise in the method for suppressing transient noise includes scaling-up or scaling-down the estimated contribution.

In still another embodiment, the method for suppressing transient noise further comprises determining, based on the adjusted estimated contribution, an estimated power level for the transient noise at each frequency, in each time frame, in the audio signal input from the first microphone.

In yet another embodiment, the method for suppressing transient noise further comprises extracting the voice data from the audio signal captured by the first microphone based on the estimated power level for the transient noise at each frequency, in each time frame, in the audio signal from the first microphone.

In another embodiment, the estimating of the contribution of the transient noise in the method for suppressing transient noise includes determining a MAP (Maximum-a-Posteriori) estimate for a part of the audio signal containing the voice data using an Expectation-Maximization algorithm.

Another embodiment of the present disclosure relates to system for suppressing transient noise, the system comprising a least one processor and a non-transitory computer-readable medium coupled to the at least one processor having instructions stored thereon that, when executed by the at least one processor, causes the at least one processor to: receive an audio signal input from a first microphone of a user device, wherein the audio signal contains voice data and transient noise captured by the first microphone; obtain information about the transient noise from a second microphone of the user device, wherein the second microphone is located separately from the first microphone in the user device, and the second microphone is located proximate to a source of the transient noise; estimate a contribution of the transient noise in the audio signal input from the first microphone based on the information about the transient noise obtained from the second microphone; and extract the voice data from the audio signal input from the first microphone based on the estimated contribution of the transient noise.

In another embodiment, the at least one processor in the system for suppressing transient noise is further caused to map the second microphone onto the first microphone using a statistical model.

In yet another embodiment, the at least one processor in the system for suppressing transient noise is further caused to adjust the estimated contribution of the transient noise in the audio signal based on the information obtained from the second microphone.

In still another embodiment, the at least one processor in the system for suppressing transient noise is further caused to adjust the estimated contribution of the transient noise by scaling-up or scaling-down the estimated contribution.

In another embodiment, the at least one processor in the system for suppressing transient noise is further caused to determine, based on the adjusted estimated contribution, an estimated power level for the transient noise at each frequency, in each time frame, in the audio signal input from the first microphone.

In another embodiment, the at least one processor in the system for suppressing transient noise is further caused to extract the voice data from the audio signal captured by the first microphone based on the estimated power level for the transient noise at each frequency, in each time frame, in the audio signal from the first microphone.

In still another embodiment, the at least one processor in the system for suppressing transient noise is further caused to determine a MAP (Maximum-a-Posteriori) estimate for a part of the audio signal containing the voice data using an Expectation-Maximization algorithm.

Yet another embodiment of the present disclosure relates to one or more non-transitory computer readable media storing computer-executable instructions that, when executed by one or more processors, causes the one or more processors to perform operations comprising: receiving an audio signal input from a first microphone of a user device, wherein the audio signal contains voice data and transient noise captured by the first microphone; receiving information about the transient noise from a second microphone of the user device, wherein the second microphone is located separately from the first microphone in the user device, and the second microphone is located proximate to a source of the transient noise; estimating a contribution of the transient noise in the audio signal input from the first microphone based on the information about the transient noise received from the second microphone; and extracting the voice data from the audio signal input from the first microphone based on the estimated contribution of the transient noise.

In another embodiment, the computer-executable instructions stored in the one or more non-transitory computer readable media, when executed by the one or more processors, cause the one or more processors to perform further operations comprising: adjusting the estimated contribution of the transient noise in the audio signal based on the information received from the second microphone; determining, based on the adjusted estimated contribution, an estimated power level for the transient noise at each frequency, in each time frame, in the audio signal input from the first microphone; and extracting the voice data from the audio signal captured by the first microphone based on the estimated power level for the transient noise at each frequency, in each time frame, in the audio signal from the first microphone.

In one or more other embodiments, the methods and systems described herein may optionally include one or more of the following additional features: the information received from the second microphone includes spectrum-amplitude information about the transient noise; the source of the transient noise is a keybed of the user device; and/or the transient noise contained in the audio signal is a key click.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
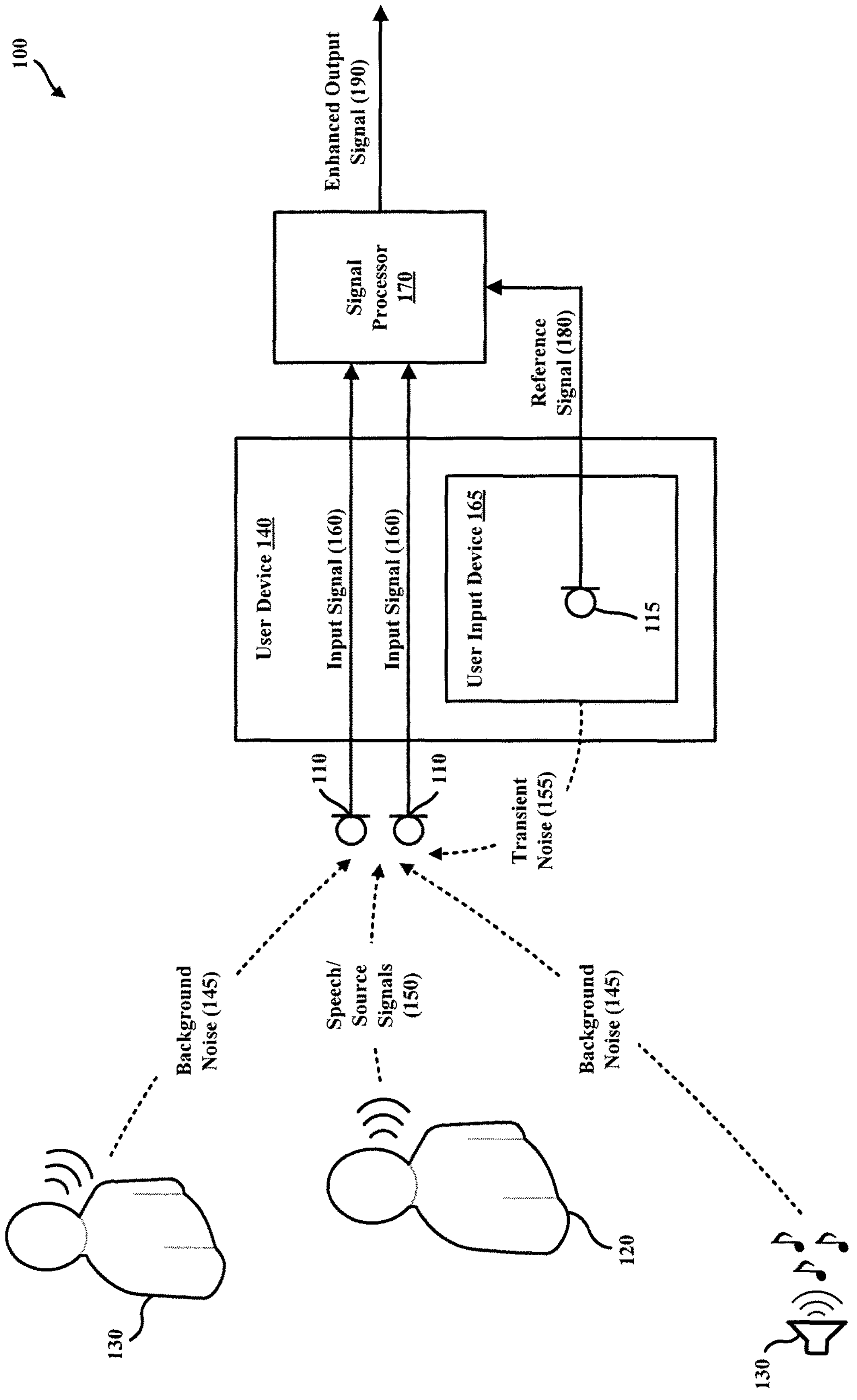
FIG. 1 is a schematic diagram illustrating an example application for transient noise suppression using input from an auxiliary microphone as a reference signal according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Overview

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant an will also understand that one or more embodiments of the present disclosure can include many other obvious features not described in detail herein. Additionally, some well-known structures or functions may not be shown or described in detail below, so as to avoid unnecessarily obscuring the relevant description.

As discussed above, users find it disruptive and annoying when keyboard typing noise is present during an audio and/or video conference. Therefore, it is desirable to remove such noise without introducing perceivable distortions to the desired speech.

The methods and systems of the present disclosure are designed to overcome existing problems in transient noise suppression for audio streams in portable user devices (e.g., laptop computers, tablet computers, mobile telephones, smartphones, etc.). In accordance with one or more embodiments described herein, one or more microphones associated with a user device records voice signals that are corrupted with ambient noise and also with transient noise from, for example, keyboard and/or mouse clicks. As will be described in greater detail below, a synchronous reference microphone embedded in the keyboard of the user device (which may sometimes be referred to herein as the "keybed" microphone) allows for measurement of the key click noise, substantially unaffected by the voice signal and ambient noise.

In accordance with at least one embodiment of the present disclosure, an algorithm is provided for incorporating the keybed microphone as a reference signal in a signal restoration process used for the voice part of the signal.

It should be noted that the problem addressed by the methods and systems described herein may be complicated by the potential presence of nonlinear vibrations in the hinge and casework of the user device, which may render a simple linear suppressor ineffective in some scenarios. Moreover, the transfer functions between key clicks and voice microphones depend strongly upon which key is being clicked. In view of these recognized complications and dependencies, the present disclosure provides a low-latency solution in which short-time transform data is processed sequentially in short frames and a robust statistical model is formulated and estimated using Bayesian inference procedures. As will be further described in the following, example results from using the methods and systems of the present disclosure with real audio recordings demonstrate a significant reduction of typing artifacts at the expense of small amounts of voice distortion.

The methods and systems described herein are designed to operate easily in real-time on standard hardware, and have very low latency so that there is no irritating delay in speaker response. Some existing approaches including, for example, model-based source separation and template-based methods have found some success in removing transient noise. However, the success of these existing approaches has been limited to more general audio restoration tasks, where real-time low-latency processing is of less concern. While other existing approaches such as non-negative matrix factorization (NMF) and independent component analysis (ICA) have proposed possible alternatives to the type of restoration performed by the methods and systems described herein, these other existing approaches are burdened by various latency and processing speed issues. Another possible restoration approach is to include operating system (OS) messages that indicate which key has been pressed and when. However, the uncertain delays involved with relying on OS messages on many systems make such an approach impractical.

Other existing approaches that have attempted to address the keystroke removal problem have used single-ended methods in which the keyboard transients must be removed "blind" from the audio stream without access to any timing or amplitude information about the key strikes. Clearly, there are issues of reliability and signal fidelity with such approaches, and speech distortions may be audible and/or keystrokes left untouched.

In contrast with existing approaches, including those described above, the methods and systems of the present disclosure utilize a reference microphone input signal for the keyboard noise and a new robust Bayesian statistical model for regressing the voice microphone on the keyboard reference microphone, which allows for direct inference about the desired voice signal while marginalizing the unwanted power spectral values of the voice and keystroke noise. In addition, as will be described in greater detail below, the present disclosure provides a straightforward and efficient Expectation-maximization (EM) procedure for fast, on-line enhancement of the corrupted signal.

The methods and systems of the present disclosure have numerous real-world applications. For example, the methods and systems may be implemented in computing devices (e.g., laptop computers, tablet computers, etc.) that have an auxiliary microphone located beneath the keyboard (or at some other location on the device besides where the one or more primary microphones are located) in order to improve the effectiveness and efficiency of transient noise suppression processing that may be performed.

FIG. 1 illustrates an example 100 of such an application, where a user device 140 (e.g., laptop computer, tablet computer, etc.) includes one or more primary audio capture devices 110 (e.g., microphones), a user input device 165 (e.g., a keyboard, keypad, keybed, etc.), and an auxiliary (e.g., secondary or reference) audio capture device 115.

The one or more primary audio capture devices 110 may capture speech/source signals (150) generated by a user 120 (e.g., an audio source), as well as background noise (145) generated from one or more background sources of audio 130. In addition, transient noise (155) generated by the user 120 operating the user input device 165 (e.g., typing on a keyboard while participating in an audio/video communication session via user device 140) may also be captured by audio capture devices 110. For example, the combination of speech/source signals (150), background noise (145), and transient noise (155) may be captured by audio capture devices 110 and input (e.g., received, obtained, etc.) as one or more input signals (100) to a signal processor 170. In accordance with at least one embodiment the signal processor 170 may operate at the client, while in accordance with at least one other embodiment the signal processor may operate at a server in communication with the user device 140 over a network (e.g., the Internet).

The auxiliary audio capture device 115 may be located internally to the user device 140 (e.g., on, beneath, beside, etc., the user input device 165) and may be configured to measure interaction with the user input device 165. For example, in accordance with at least one embodiment, the auxiliary audio capture device 115 measures keystrokes generated from interaction with the keybed. The information obtained by the auxiliary microphone 115 may then be used to better restore a voice microphone signal which is corrupted by key clicks (e.g., input signal (160), which may be corrupted by transient noises (155)) resulting from the interaction with the keybed. For example, the information obtained by the auxiliary microphone 115 may be input as a reference signal (180) to the signal processor 170.

As will be described in greater detail below, the signal processor 170 may be configured to perform a signal restoration algorithm on the received input signal (160) (e.g., voice signal) using the reference signal (180) from the auxiliary audio capture device 115. In accordance with one or more embodiments, the signal processor 170 may implement a statistical model for mapping the auxiliary microphone 115 onto the voice microphone 110. For example, if a key click is measured on the auxiliary microphone 115, the signal processor 170 may use the statistical model to transform the key click measurement into something that can be used to estimate the key click contribution in the voice microphone signal 110.

In accordance with at least one embodiment of the present disclosure, spectrum-amplitude information from the keybed microphone 115 may be used to scale up or scale down the estimation of the keystroke in the voice microphone. This results in an estimated power level for the key click noise at each frequency, in each time frame, in the voice microphone. The voice signal may then be extracted based on this estimated power level for the key click noise at each frequency, in each time frame, in the voice microphone.

In one or more other examples, the methods and systems of the present disclosure may be used in mobile devices (e.g., mobile telephones, smartphones, personal digital assistants, (PDAs)) and in various systems designed to control devices by means of speech recognition.

Figure 2:
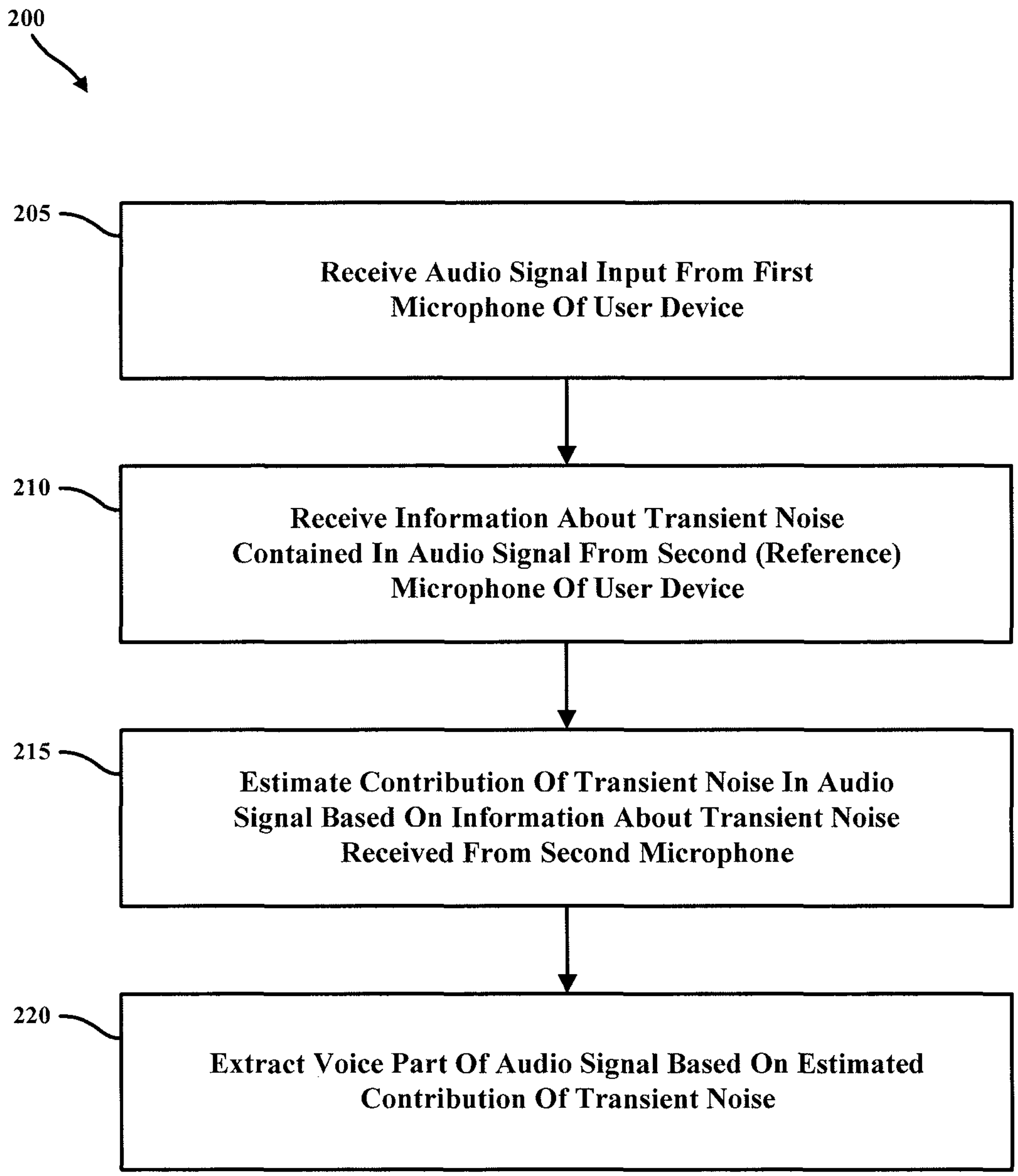
FIG. 2 is flowchart illustrating an example method for suppressing transient noise in an audio signal using an auxiliary microphone input signal as a reference signal according to one or more embodiments described herein.
Figure 3:
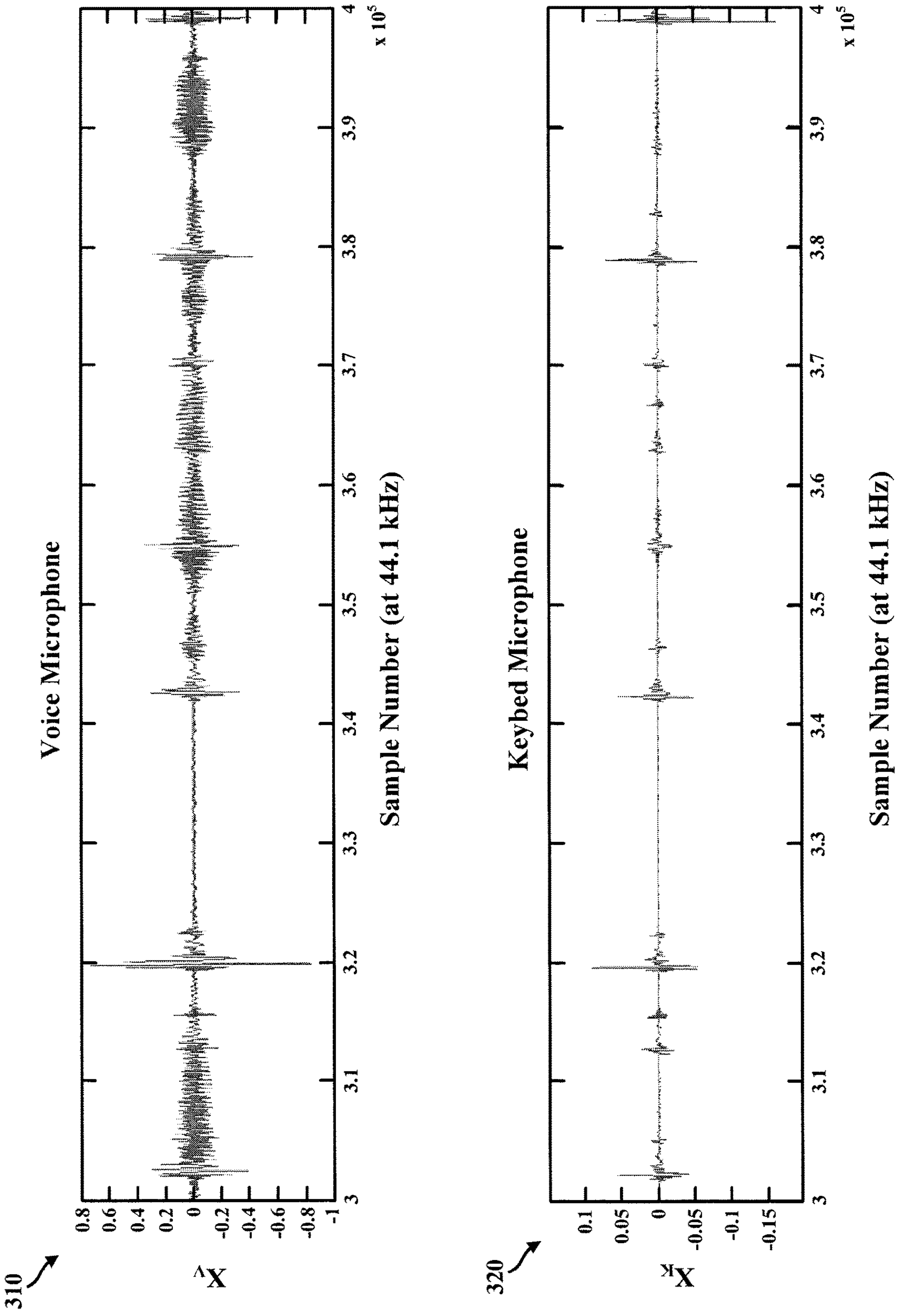
FIG. 3 is a set of graphical representations illustrating example simultaneously recorded waveforms for primary and auxiliary microphones according to one or more embodiments described herein.

The following provides details about the transient noise detection and signal restoration algorithm of the present disclosure, and also describes some example performance results of the algorithm. FIG. 2 illustrates art example high-level process 200 for suppressing transient noise in an audio signal using an auxiliary microphone input signal as a reference signal. The details of blocks 205-215 in the example process 200 will be further described in the following.

Recording Setup

To further illustrate various features of the methods and system described herein, the following provides an example setup in accordance with one or more embodiments of the present disclosure. In the present scenario, a reference microphone (e.g., the keybed microphone) records the sounds made by key strikes directly, and uses this as an auxiliary audio stream to aid the restoration of the primary voice channel. Also available are synchronized recordings sampled at 44.1 kHz of the voice microphone waveform, $X_V$ and the keybed microphone waveform, $X_K$. The keybed microphone is placed below the keyboard in the body of the user device, and is acoustically insulated from the surrounding environment. The signal captured by the keybed microphone may be reasonably assumed to contain very little of the desired speech and ambient noise, and thus serves as a good reference recording of the contaminating keystroke noise. From this point forward, it may be assumed that the audio data has been transformed into a time-frequency domain using any suitable method known to those skilled in the art (e.g., the short-time Fourier Transform (STFT)). For example, in the case of the STFT, $X_{V,j,t}$ and $X_{K,j,t}$ will represent complex frequency coefficients at some frequency bin j and time frame t (although in the following description these indices may be omitted where no ambiguity is introduced as a result).

Modelling and Inference

One approach may model the voice waveform assuming a linear transfer function $H_j$ at frequency bin j between the reference microphone and the voice microphone, and assuming that no speech contaminates the keybed microphone:

$$X_{V,j}=V_j+H_jX_{K,j},$$

omitting the time frame index, where V is the desired voice signal and H is the transfer function front the measured keybed microphone $X_K$ to the voice microphone. However, this formulation presents some difficult issues. For example, keystrokes from different keys will have different transfer functions, meaning that either a large library of transfer functions will need to be learned for each key, or the system will need to be very rapidly adaptive when a new key is pressed. In addition, significant random differences have been observed in experimentally measured transfer functions from a real system between repeated key strikes on the same key. One possible explanation for these significant differences is that they are caused by non-linear "rattle"-type oscillations that are set up in typical hardware systems.

Therefore, while a linear transfer function approach may be useful in certain limited scenarios, such an approach is unable to completely remove the effects of keystroke disturbances in the majority of instances.

In view of the issues described above, the present disclosure provides a robust signal-based approach, in which the random perturbations and nonlinearities in the transfer function are modelled as random effects in measured keystroke waveform K at the voice microphone:

$$X_{V,j}=V_j+K_j \quad ,(1)$$

where V is the desired voice signal and K is the undesired key click.

Robust Model and Prior Distributions

In accordance with at least one embodiment of the present disclosure, statistical models may be formulated for both the voice and keyboard signals in the frequency domain. These models exhibit the known characteristics of speech signals in the time-frequency domain (e.g., sparsity and heavy-tailed (non-Gaussian) behavior). $V_j$ is modeled as a conditional complex normal distribution with random variance that is distributed as an inverted gamma distribution, which is known to be equivalent to modelling $V_j$ as a heavy-tailed Student-t distribution, $$V_j|\sigma_{V_j}\sim\mathcal{N}_C(0,\sigma_{V_j}^2),\sigma_{V_j}^2\sim\mathcal{IG}(\alpha_V,\beta_V) \quad (2)$$

where ~ denotes that a random variable is drawn according to the distribution to the right, $N_C$ is the complex normal distribution and IG is the inverted-gamma distribution. The prior parameters ($\alpha_V$, $\beta_V$) are tuned to match the spectral variability of speech and/or the previous estimated speech spectra from earlier frames, which will be described in greater detail below. Such a model has been found effective in a number of audio enhancement/separation domains, and is in contrast with other Gaussian or non-Gaussian statistical speech models known those skilled in the art.

In accordance with one or more embodiments described herein, the keyboard component K is decomposed also in terms of a heavy-tailed distribution, but with its scaling regressed on the secondary reference channel $X_{K,j}$:

$$K_j|\sigma_{K,j},\alpha,X_{K,j}\sim\mathcal{N}_C(0,\alpha^2\sigma_{K,j}^2|X_{K,j}|^2),\sigma_{K,j}^2\sim\mathcal{IG}(\alpha_K,\beta_K) \quad (3)$$

with α being a random variable that scales the whole spectrum by a random gain factor (it should be noted that in cases where an approximate spectral shape is known for the scaling (e.g., $f_j$), which might, for example, be a low-pass filter response, the approximate spectral shape may be incorporated throughout the following simply by replacing α with $\alpha f_j$):

$$\alpha^2\sim IG(\alpha_\alpha,\beta_\alpha). \quad (4)$$

The following conditional independence assumptions about the prior distributions may be made: (i) all voice and keyboard components, V and K, respectively, are drawn independently across frequencies and time conditional upon their scaling parameters $\sigma_{V/K}$; (ii) these scaling parameters are independently drawn from the above prior structures condition upon the overall gain factor α; and (iii) all of these components are a priori independent of the value of the input regressor variable $X_K$. These assumptions are reasonable in most cases and simplify the form of the probability distributions.

The methods and systems of the present disclosure are at least partially motivated by the observation that the frequency response between keybed microphone and voice microphone has an approximately constant gain magnitude response across frequencies (this is modelled as the unknown gain α, but subject to random perturbations of both amplitude and phase (modelled by the IG distribution on $\sigma_{K,j}^2$)). In order to remove an obvious scaling ambiguity in the product $\alpha^2\sigma_{K,j}^2$ the prior maximum of $\sigma_{K,j}^2$ may be set to unity. The remaining prior values may be tuned to match the observed characteristics of the real recorded datasets, which is described in greater detail below.

In accordance with one or more embodiments, the methods and systems described herein aim to estimate the desired voice signal ($V_j$) based on the observed signals $X_V$ and $X_K$. As such, a suitable object for inference is the posterior distribution, $$p(V|X_V,X_K)=\int_{\alpha,\sigma_K,\sigma_V}p(V,\alpha,\sigma_K,\sigma_V|X_V,X_K)\,d\alpha\, d\sigma_K\, d\sigma_V,$$

where $(\sigma_K, \sigma_V)$ is the collection of scale parameters $\{\sigma_{K,j}, \sigma_{V,j}\}$ across all frequency bins j in the current time frame. From the posterior distribution, the expected value $E[V|V_V, X_K]$ for a MMSE (minimum mean square error) estimation scheme may be extracted, or some other estimate (e.g., based on a perceptual cost function) obtained in a manner known to those skilled in the art. Such expectations are often handled using, for example, Bayesian Monte Carlo methods. However, because Monte Carlo schemes are likely to render the processing non-real-time the methods and systems provided herein avoid the use of such techniques. Instead, in accordance with one or more embodiments, the methods and systems of the present disclosure utilize a MAP (Maximum-a-Posteriori) estimation using a generalized Expectation-Maximization (EM) algorithm:

$$\hat{V},\hat{\alpha}=\operatorname{argmax}_{V,\alpha}p(V,\alpha|X_V,X_K),$$

where $\alpha$ is included in the optimization to avoid an extra numerical integration.

Development of EM Algorithm

In the EM algorithm, latent variables to be integrated out are first defined. In the present model, such latent variables include $(\sigma_K, \sigma_V)$. The algorithm then operates iteratively, starting with an initial estimate $(V^0, \alpha^0)$. At iteration i, an expectation Q of the complete data log-likelihood may be computed as follows (it should be noted that the following is the Bayesian formulation of EM in which a prior distribution is included for the unknowns V and $\alpha$):

$$Q((V,\alpha),(V^{(i)},\alpha^{(i)}))=E[\log(p((V,\alpha)|X_K,X_V,\sigma_V,\sigma_K))|(V^{(i)},\alpha^{(i)})],$$

where $(V^{(i)}, \alpha^{(i)})$ is the ith iteration estimate of $(V, \alpha)$. The expectation is taken with respect to $p(\sigma_V, \sigma_K|\alpha^{(i)}, V^{(i)}, X_K, X_V)$, which simplifies under the conditional independence assumptions (described above) to $$p(\sigma_V,\sigma_K|\alpha^{(i)},V^{(i)},X_K,X_V)=\Pi_j p(\sigma_{V,j}|V_j^{(i)})p(\sigma_{K,j}|K^{(i)},\alpha^{(i)},X_{K,j}) \quad (4)$$

where $K_j^{(i)}=X_{V,j}-V^{(i)}$ is the current estimate of the unwanted keystroke coefficient at frequency j.

Where the conditional independence assumptions are applied, the log-conditional distribution may be expanded over frequency bins j using Bayes' Theorem as follows:

$$\log(p((V,\alpha)|X_K,X_V,\sigma_V,\sigma_K)) \doteq \log(p(\alpha^2))+\Sigma_j\log(p(V_j|\sigma_{V,j}))+\log(p(X_{V,j}|V_j,\sigma_{K,j},\alpha))$$

where the notation $\doteq$ is understood to mean "left-hand side (LHS)=right-hand side (RHS) up to an additive constant," which, in the present case, is a constant that does not depend on $(V, \alpha)$.

The expectation portion of the algorithm thus simplifies to the following:

$$E[\log(p((V,\alpha)|X_K,X_V,\sigma_V,\sigma_K))|(V^{(i)},a^{(i)})] \doteq E\log(p(\alpha^2)) + \sum_j E\log(p(V_j|\sigma_{V,j})) + E\log(p(X_{V,j}|X_{K,j},V_j,\sigma_{K,j},\alpha)) = E_\alpha + \sum_j E_{V_j} + E_{K_j}$$

where the expectations $E_\alpha$, $E_{V_j}$, and $E_{K_j}$ are defined from the line above. The log-likelihood term and prior estimate for may now be obtained from equations (1), (2), and (3) (presented above), leading to the following expressions for the expectations $E_\alpha$, $E_{V_j}$, and $E_{K_j}$:

$$E_\alpha = \log(p(\alpha^2)),\ E_{V_j} = -\frac{1}{2}|V_j|^2 E\left[\frac{1}{\sigma^2_{V_j}}\right],$$

$$E_{K_j} = -2\log(\alpha) - \frac{|(X_{V_j}-V_j)|^2}{2\alpha^2|X_{K,j}|^2}E\left[\frac{1}{\sigma^2_{K,j}}\right].$$

Now, consider $E[1/\sigma_{V_j}^2]$. Under the conjugate choice of prior density, as in equation (2), and again making use of the conditional independence assumptions, as in equation (5), $$p(\sigma 2^2_{V_j}|V_j^{(i)}) \propto \frac{1}{2\pi\sigma^2_{V_j}}\exp\left(-\frac{1}{2\sigma^2_{V_j}}|V_j^{(i)}|^2\right)IG(\sigma^2_{V,j}|\alpha_V,\beta_V) = IG\left(\sigma^2_{V_j}\,\middle|\,\alpha_V+1,\beta_V+\frac{|V_j^{(i)}|^2}{2}\right)$$

Therefore, at the ith iteration:

$$E[1/\sigma^2_{V_j}] = \frac{\alpha_V+1}{\beta_V+\frac{|V_j^{(i)}|^2}{2}},$$

which is the mean of the corresponding gamma distribution for $1/\sigma_{V_j}^2$. In accordance with at least one embodiment, for prior mixing distributions other than the simplest inverted-gamma, this expectation may be computed numerically and stored, for example, in a look-up table.

By similar reasoning, the conditional distribution for $\sigma_{K_j}^2$ in equation (5) may be obtained as:

$$p(\sigma^2_{K_j}|X_{K,j},\alpha^{(i)},K_j^{(i)}) \propto \frac{1}{2\pi\sigma^2_{K,j}\alpha^{i2}|X_{K,j}|^2}\exp\left(-\frac{1}{2\sigma^2_{K,j}\alpha^2|X_{K,j}|^2}|K_j^{(i)}|^2\right)IG(\sigma^2_{K,j}|\alpha_K,\beta_K) = IG\left(\alpha_K+1,\beta_K+\frac{|K_j^{(i)}|^2}{2\alpha^{(i)2}|X_{K,j}|^2}\right).$$

Therefore, at the ith iteration:

$$E\left[\frac{1}{\sigma^2_{K,j}}\right] = \frac{\alpha_K+1}{\beta_K+\frac{|K_j^{(i)}|^2}{2\alpha^{(i)2}|X_{K,j}|^2}}$$

Substituting the computed expectations into Q, the maximization portion of the algorithm maximizes Q jointly with respect to $(V, \alpha)$. Because of the complex structure of the model, such maximization is difficult to achieve in closed form for this Q function. Instead, in accordance with one or more embodiments described herein, the method of the present disclosure utilizes iterative formulae for maximizing V with $\alpha$ fixed, then maximizing $\alpha$ with V fixed at the new value, and repeating this several times within each EM iteration. Such an approach is a generalized EM, which, similar to standard EM, guarantees convergence to a maximum of the probability surface, since each iteration is guaranteed to increase the probability of the current iteration's estimate (e.g., this could be a local maximum, just like for standard EM). Therefore, the generalized EM algorithm described herein guarantees that the posterior probability is non-decreasing at each iteration, and thus can be expected to converge to the true MAP solution with increasing iteration number.

Omitting (for purposes of brevity) the algebraic steps in finding the maxima of Q with respect to V and α, the following maximization step updates may be arrived at. Notation is such that the generalized maximization step may be initialized at each iteration with $V_j^{(i+1)}=V_j^{(1)}$, $K_j^{(i+1)}=X_{V,j}-V_j^{(i)}$, and $\alpha^{(i+1)}=\alpha^{(i)}$ the final values from the previous iteration, and iterating the following fixed point equations several times, which refine the estimates at the new iteration i+1. It should be noted that the update for $V_j$ may be considered a Weiner filter gain, which is applied independently and in parallel for all frequencies j=1, . . . , J, $$V_j^{(i+1)} = \frac{E\left[\frac{1}{\sigma_{V_j}^2}\right]}{E\left[\frac{1}{\sigma_{V_j}^2}\right] + \frac{E\left[\frac{1}{\sigma_{K,j}^2}\right]}{\alpha^{(i+1)^2}|X_{K,j}|^2}} X_{V,j} \quad (6)$$

and for α:

$$\alpha^{(i+1)} = \sqrt{\frac{\beta_\alpha + \sum_j E\left[\frac{1}{\sigma_{K,j}^2}\right]\frac{1}{2|X_{K,j}|^2}\left(|K_j^{(i+1)}|^2\right)}{\alpha_\alpha + 1 + j}} \quad (7)$$

where J is the total number of frequency bins.

Once the EM process described above has run for a number of iterations, and is satisfactorily converged, the resulting spectral components $V_j$ may be transformed back to the time domain (e.g., via the inverse last Fourier transform (FFT) in the short time Fourier transform (STFT) case) and reconstructed into a continuous signal by windowed overlap-add procedures.

Example

To further illustrate the various features of the signal restoration methods and systems of the present disclosure, the following describes some example results that may be obtained through experimentation. It should be understood that although the following provides example performance results in the context of a laptop computer containing an auxiliary microphone located beneath the keyboard, the scope of the present disclosure is not limited to this particular context or implementation. Instead, similar levels of performance may also be achieved using the methods and systems of the present disclosure in various other contexts and/or scenarios involving other types of user devices, including, for example, where the auxiliary microphone is at a location on the user device other than beneath the keyboard (but not at the same or similar location as one or more primary microphones of the device).

The present example is based on audio files recorded from a laptop computer containing at least one primary microphone (e.g., voice microphone) and also an auxiliary microphone located beneath the keyboard (e.g., keybed microphone). Sampling is performed synchronously at 44.1 kHz from the voice and keybed microphones, and processing carried out using a generalized EM algorithm. Frame lengths of 1024 samples may be used for an STFT transform, with 50% overlap and Hanning analysis windows.

In the present example, it is possible to record extracts of voice alone, and then of key strokes alone, and then add together the signals recorded in order to obtain corrupted microphone signals for which "ground truth" restorations are available Prior parameters for the Bayesian model may be fixed as follows:

(1) Prior $\sigma_{V,j}^2 \sim IG(\alpha_V, \beta_{V,j})$ (it should be noted that the scale parameter $\beta_V$ is made explicitly frequency-dependent). The degrees of freedom are fixed to $\alpha_V=4$ in order to allow a degree of flexibility and heavy-tailed behavior in the voice signal. The parameter $\beta_{V,j}$ may be set in a frequency-dependent manner as follows: (i) the final EM-estimated voice signal from the previous frame, $|\hat{V}_j|^2$, is used to give a prior estimate of $\sigma_{V,j}^2$ for the current frame, and (ii) $\beta_{V,j}$ is then fixed such that the mode of the IG distribution is equal to $|\hat{V}_j|^2$, for example, by setting $\beta_{V,j}=|\hat{V}_j|^2(\alpha_V+1)$. This encourages some spectral continuity from previous frames, which reduces artefacts in the processed audio, and also allows for some reconstruction of heavily corrupted frames based on what has gone before.

(2) Prior $\sigma_{K,j}^2 \sim IG(\alpha_K, \beta_K)$. This may be fixed across all frequencies to $\alpha_K=3$, $\beta_K=3$, leading to a mode at $\sigma_{K,j}^2=0.75$.

(3) Prior $\alpha \sim IG(\alpha_\alpha, \beta_\alpha)$; $\alpha_\alpha 4$, $\beta_\alpha=100{,}00\ (\alpha_\alpha+1)$, which places the prior mode for α2 at 100,000, which is tuned by hand from experimental analysis of data recorded with just keystroke noise present.

In the present example, it is determined from testing various configurations for the EM that results converge with little further improvement after approximately ten iterations, with two sub-iterations of the generalized maximization-step of equations (6) and (7) per full EM iteration. These parameters may then be fixed for all subsequent simulations.

It is important to note that, in accordance with one or more embodiments described herein, a time-domain detector may be devised to flag corrupted frames, and processing may only be applied to frames for which detection was flagged, therefore avoiding unnecessary signal distortions and wasted computations through processing in uncorrupted frames. In at least the present example, the time-domain detector comprises a rule-based combination of detections from the keybed microphone signal and two available (stereo) voice microphones. Within each audio stream, detections are based on an autoregressive (AR) error signal, and frames are flagged as corrupted when the maximum error magnitude exceeds a certain factor of the median error magnitude for that frame.

Performance may be evaluated using an average segmental signal-to-noise (SNR) measure $$seg\text{-}SNR = \frac{1}{N}\sum_{n-1}^{N} 10\log_{10}\frac{\sum_{t=1}^{T} v_{t,n}^2}{\sum_{t=1}^{T}(v_{t,n}^2 - \hat{v}_{t,n})^2},$$

where $v_{t,n}$ is the true, uncorrupted, voice signal at the ith sample of the nth frame, and $\hat{v}$ is the corresponding estimate of v. Performance is compared against a straightforward procedure which mutes the spectral components to zero in frames that are detected as corrupted.

Results illustrate an improvement on average of approximately 3 dB when taken over the whole speech extract, and 6-10 dB when inducing just the frames detected as corrupted. These example results may be adjusted by tuning the prior parameters to trade-off perceived signal distortion against suppression levels of the noise. Although these example results may appear to be relatively small improvements, the perceptual effect of the EM approach, as used in accordance with the methods and systems of the present disclosure, is significantly improved compared with muting the signal and compared with the corrupted input audio.

Figure 4:
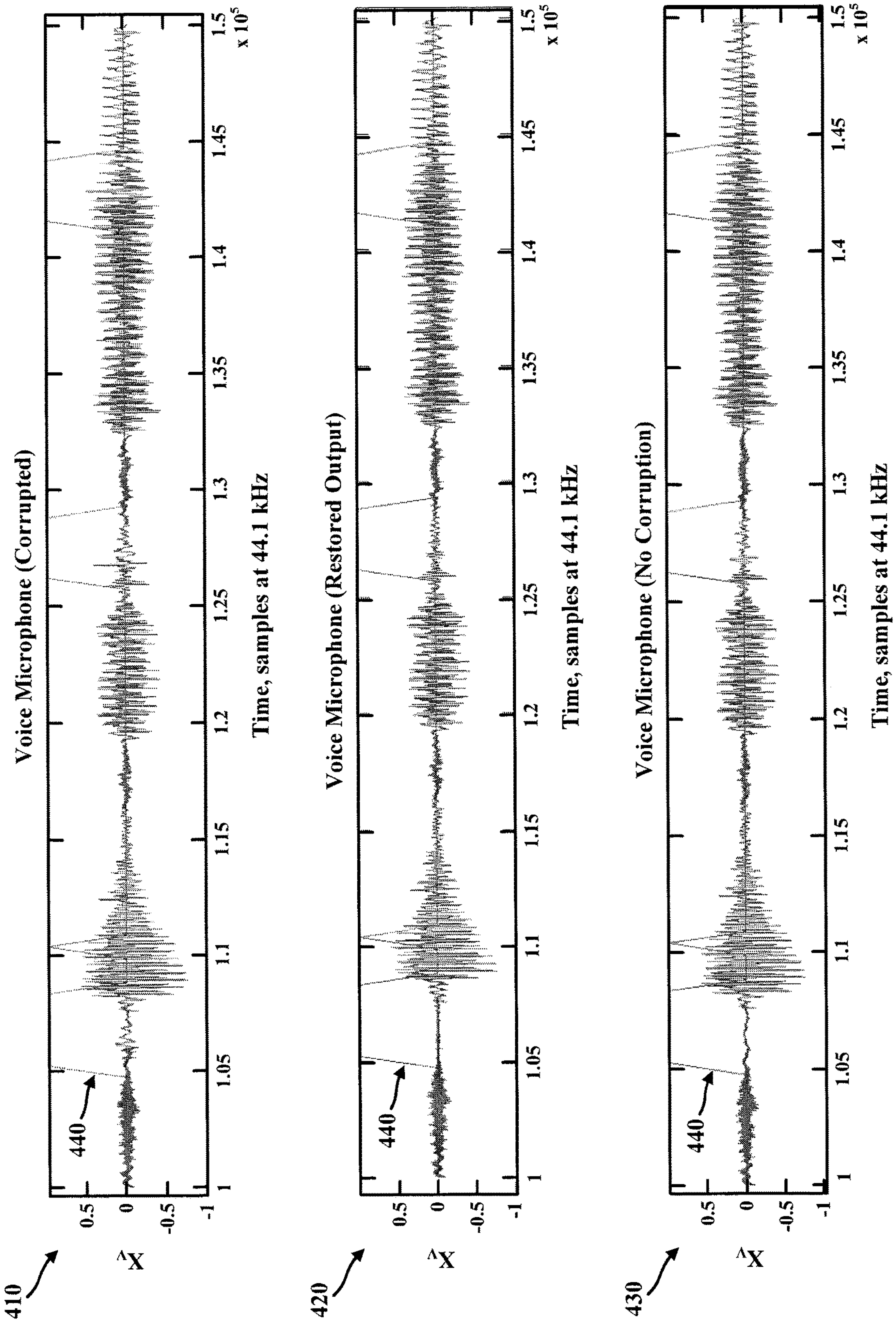
FIG. 4 is a set of graphical representations illustrating example performance results for a transient noise detection and restoration algorithm according to one or more embodiments described herein.

FIG. 4 illustrates an example detection and restoration in accordance with one or more embodiments described herein. In all three graphical representations 410, 420, and 430, the frames detected as corrupted are indicated by the zero-one waveform 440. These example detections agree with a visual study of the key click data waveform.

Graphical representation 410 shows the corrupted input from the voice microphone, graphical representation 420 shows the restored output from the voice microphone, and graphical representation 430 shows the original voice signal without any corruption (available in the present example as "ground-truth"). It should be noted that in graphical representation 420, the speech envelope and speech events are preserved around 125 k samples and 140 k samples, while the disturbance is suppressed well around 105 k samples. It can be seen from the example performance results that the audio is significantly improved in the restoration, leaving very little "click" residue, which can be removed by various post-processing techniques known to those skilled in the art. In the present example, a favorable 10.1 dB improvement in segmental SNR is obtained for corrupted frames (as compared to using a "muting restoration"), and 2.5 dB improvement when all frames are considered (including the uncorrupted frames).

Figure 5:
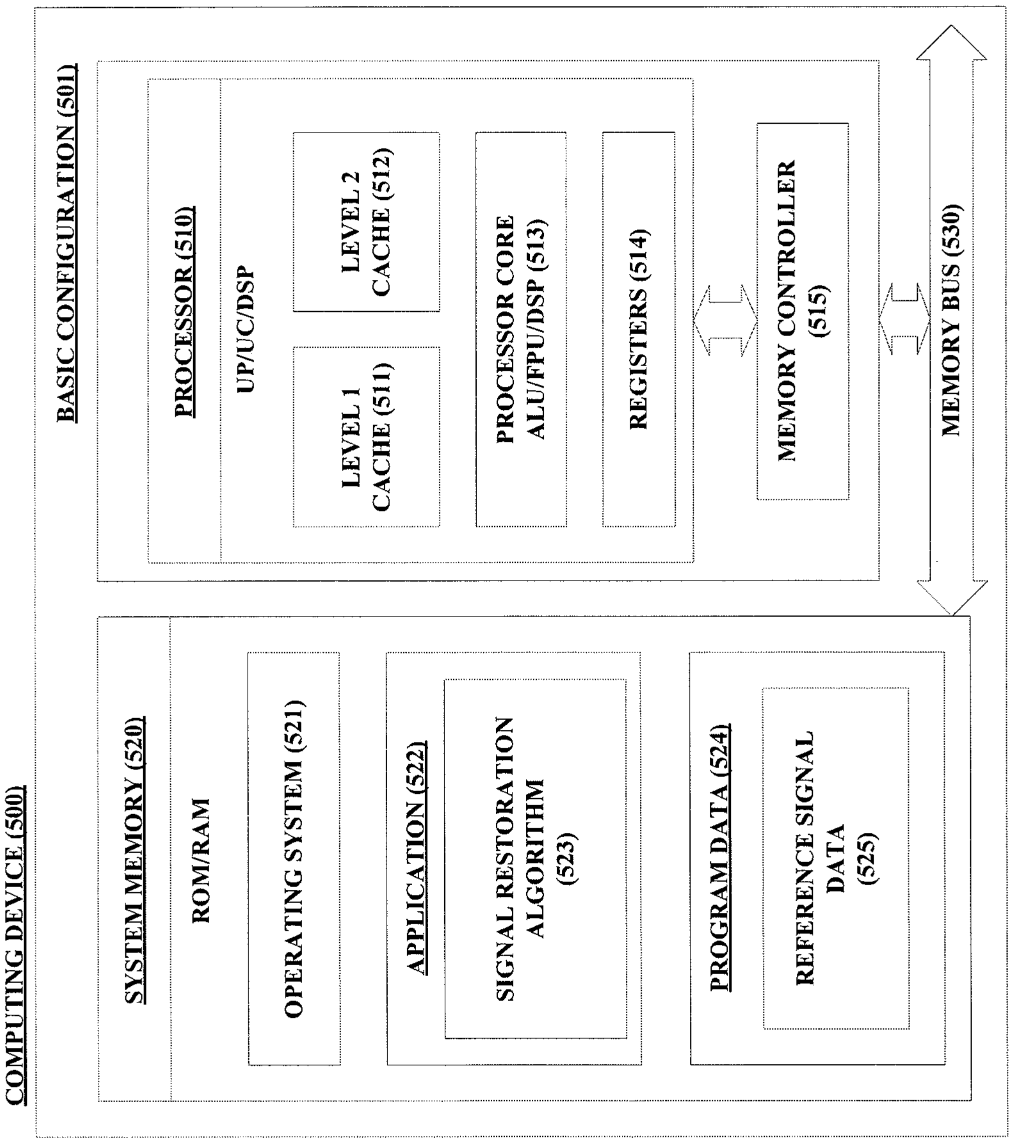
FIG. 5 is a block diagram illustrating an example computing device arranged for suppressing transient noise in an audio signal by incorporating an auxiliary microphone input signal as a reference signal according to one or more embodiments described herein.

FIG. 5 is a high-level block diagram of an exemplary computer (500) arranged for suppressing transient noise in an audio signal by incorporating an auxiliary microphone input signal as a reference signal, according to one or more embodiments described herein. In accordance with at least one embodiment, the computer (500) may be configured to utilize spatial selectivity to separate direct and reverberant energy and account for noise separately, thereby considering the response of the beamformer to reverberant sound and the effect of noise. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (μP), a microcontroller (μC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (515) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include Signal Restoration Algorithm (823) for suppressing transient noise in an audio signal containing voice data by using information about the transient noise received from a reference (e.g., auxiliary) microphone located in close proximity to the source of the transient noise, in accordance with one or more embodiments described herein. Program Data (524) may include storing instructions that, when executed by the one or more processing devices, implement a method for suppressing transient noise by using a statistical model to map a reference microphone onto a voice microphone (e.g., auxiliary microphone 115 and voice microphone 110 in the example system 100 shown in FIG. 1) so that information about a transient noise from the reference microphone can be used to estimate a contribution of the transient noise in the signal captured by the voice microphone, according to one or more embodiments described herein.

Additionally, in accordance with at least one embodiment, program data (824) may include reference signal data (525), which may include data (e.g., spectrum-amplitude data) about a transient noise measured by a reference microphone (e.g., reference microphone 115 in the example system 100 shown in FIG. 1). In some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions anchor operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually can y out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, at data processing hardware of a user device, a sequence of acoustic frames from a first microphone of the user device, the sequence of acoustic frames containing voice data and transient noise captured by the first microphone;

receiving, at the data processing hardware, from a second microphone of the user device, information about the transient noise, wherein the second microphone is located:

separately from the first microphone; and proximate to a source of the transient noise;

for each respective acoustic frame in the sequence of acoustic frames:

determining, by the data processing hardware, based on the sequence of acoustic frames, a median error magnitude, and the information about the transient noise, whether the respective acoustic frame includes at least a threshold amount of transient noise; and when the respective acoustic frame includes at least the threshold amount of transient noise:

estimating, by the data processing hardware, using a statistical model configured to map the second microphone onto the first microphone, a contribution of the transient noise in the respective acoustic frame received from the first microphone based on the information about the transient noise received from the second microphone; and producing, by the data processing hardware, a voice frame with reduced transient noise by extracting the voice data from the respective acoustic-frame received from the first microphone based on the estimated contribution of the transient noise; and generating, by the data processing hardware, an audible output based on the sequence of acoustic frames and the voice frames produced from the sequence of acoustic frames.

2. The method of claim 1, wherein estimating the contribution of the transient noise in the respective acoustic frame from the first microphone is further based on Bayesian inference methods.

3. The method of claim 1, wherein the information received from the second microphone includes spectrum-amplitude information about the transient noise.

4. The method of claim 1, wherein the source of the transient noise is a keybed of the user device, and the transient noise contained in the respective acoustic frame is a key click.

5. The method of claim 1, further comprising adjusting, by the data processing hardware, the estimated contribution of the transient noise in the respective acoustic frame based on the information received from the second microphone.

6. The method of claim 5, wherein adjusting the estimated contribution of the transient noise in the respective acoustic frame includes scaling-up or scaling-down the estimated contribution.

7. The method of claim 5, further comprising determining, by the data processing hardware, based on the adjusted estimated contribution, an estimated power level for the transient noise at each frequency, in each time frame, in the respective acoustic frame from the first microphone.

8. The method of claim 7, further comprising extracting, by the data processing hardware, the voice data from the respective acoustic frame captured by the first microphone based on the estimated power level for the transient noise at each frequency, in each time frame, in the respective acoustic frame from the first microphone.

9. The method of claim 1, wherein estimating the contribution of the transient noise in the respective acoustic frame includes: determining a MAP (Maximum-a-Posteriori) estimate for a part of the respective acoustic frame containing the voice data using an Expectation-Maximization algorithm.

10. The method of claim 1, wherein estimating the contribution of the transient noise in the respective acoustic frame from the first microphone comprises estimating a power level for the transient noise at each frequency in each of a plurality of time frames.

11. A system comprising:

data processing hardware of a user device; and memory hardware in communication with the data processing hardware, the memory hardware storing instructions that when executed on the data processing hardware cause the data processing hardware to perform operations comprising:

receiving an audio signal from a first microphone of the user device, a sequence of acoustic frames containing voice data and transient noise captured by the first microphone;

obtaining, from a second microphone of the user device, information about the transient noise, wherein the second microphone is located:

separately from the first microphone and proximate to a source of the transient noise;

for each respective acoustic frame in the sequence of acoustic frames:

determining, based on the sequence of acoustic frames, a median error magnitude, and the information about the transient noise, whether the respective acoustic frame includes at least a threshold amount of transient noise; and when the respective acoustic frame includes at least the threshold amount of transient noise:

estimating, using a statistical model configured to map the second microphone onto the first microphone, a contribution of the transient noise in the respective acoustic frame received from the first microphone; and producing a voice frame with reduced noise by extracting the voice data from the respective acoustic frame received from the first microphone based on the estimated contribution of the transient noise; and generating an audible output based on the sequence of acoustic frames and the voice frames produced from the sequence of acoustic frames.

12. The system of claim 11, wherein estimating the contribution of the transient noise in the respective acoustic frame from the first microphone is further based on Bayesian inference methods.

13. The system of claim 11, wherein the information obtained from the second microphone includes spectrum-amplitude information about the transient noise.

14. The system of claim 11, wherein the source of the transient noise is a keybed of the user device, and the transient noise contained in the respective acoustic frame is a key click.

15. The system of claim 11, wherein the operations further comprise adjusting the estimated contribution of the transient noise in the respective acoustic frame based on the information obtained from the second microphone.

16. The system of claim 15, wherein the operations further comprise adjusting the estimated contribution of the transient noise by scaling-up or scaling-down the estimated contribution.

17. The system of claim 15, wherein the operations further comprise determining, based on the adjusted estimated contribution, an estimated power level for the transient noise at each frequency, in each time frame, in the respective acoustic frame from the first microphone.

18. The system of claim 17, wherein the operations further comprise extracting the voice data from the respective acoustic frame captured by the first microphone based on the estimated power level for the transient noise at each frequency, in each time frame, in the respective acoustic frame from the first microphone.

19. The system of claim 11, wherein the operations further comprise determining a MAP (Maximum-a-Posteriori) estimate for a part of the respective acoustic frame containing the voice data using an Expectation-Maximization algorithm.

20. The system of claim 11, wherein estimating the contribution of the transient noise in the respective acoustic frame from the first microphone comprises an estimate of a power level for the transient noise at each frequency in each of a plurality of time frames.

* * * * *